Sept. 23, 1969　　　R. G. OLSON ET AL　　　3,468,464
STOCK FEED MECHANISM
Filed Oct. 24, 1967　　　　　　　　　　　　　　2 Sheets-Sheet 1
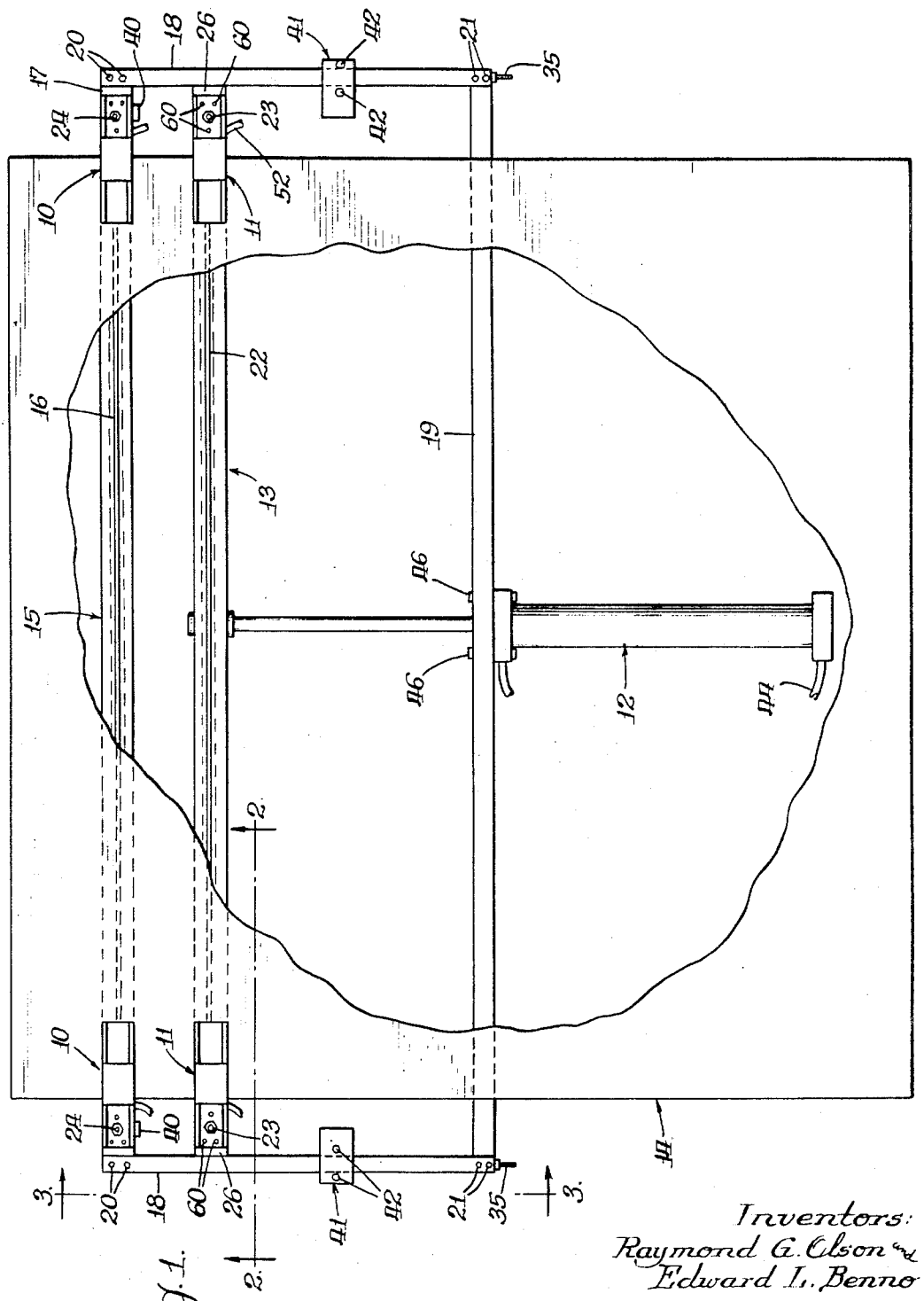
Inventors:
Raymond G. Olson
Edward L. Benno
By Snow and Benno
Attys.

Sept. 23, 1969  R. G. OLSON ET AL  3,468,464
STOCK FEED MECHANISM
Filed Oct. 24, 1967  2 Sheets-Sheet 2
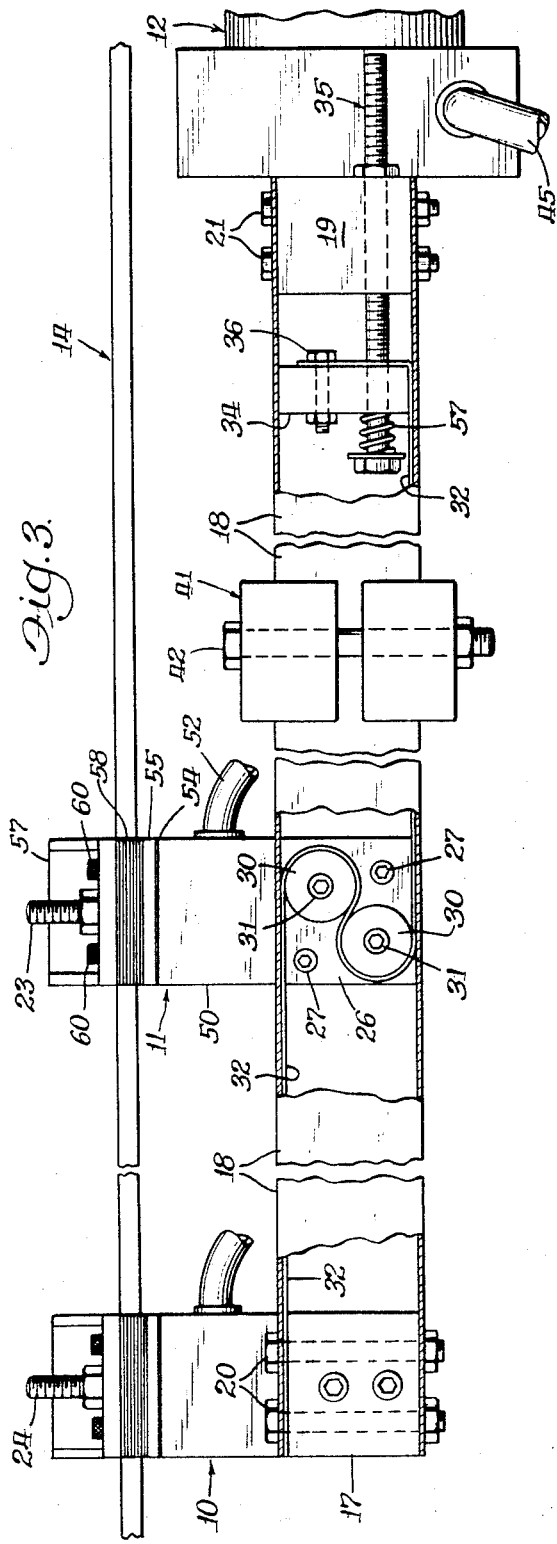
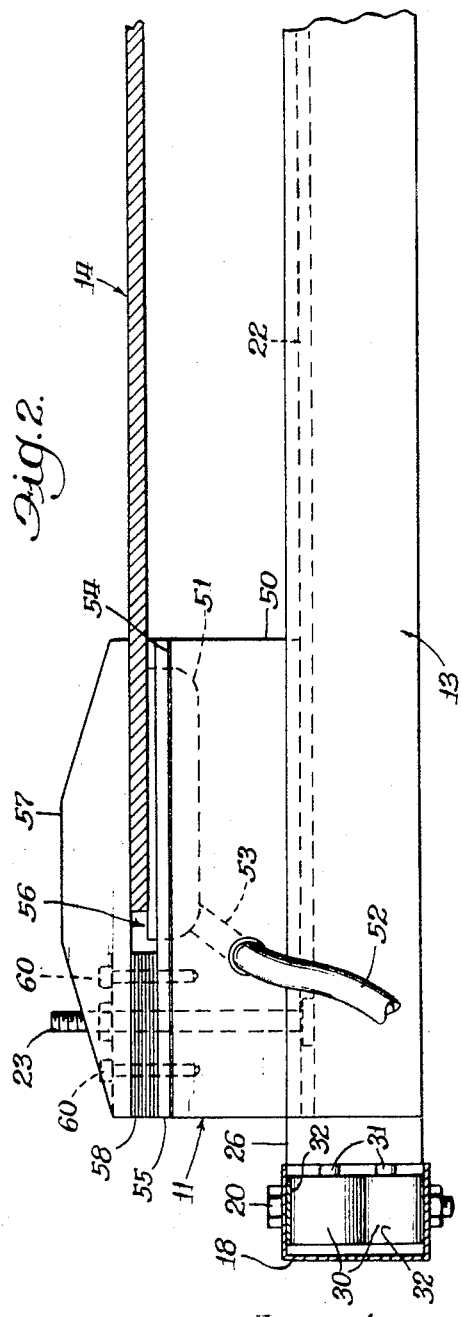
Inventors:
Raymond G. Olson and
Edward L. Benno
By Snow and Benno
Attys.

United States Patent Office 3,468,464
Patented Sept. 23, 1969

3,468,464
STOCK FEED MECHANISM
Raymond G. Olson, Niles, and Edward L. Benno, Grayslake, Ill., assignors, by mesne assignments, to Standard International Corporation, Andover, Mass., a corporation of Ohio
Filed Oct. 24, 1967, Ser. No. 677,553
Int. Cl. B65h 17/42
U.S. Cl. 226—141          10 Claims

ABSTRACT OF THE DISCLOSURE

The invention is concerned with strip or sheet feeding devices and particularly such feed mechanisms adapted for feeding relatively wide sheets in increments to another machine for further work on the stock. The present embodiment includes a pair of spaced apart stationary or holding jaws or grippers for gripping the opposite edges of the sheet or stock to be fed, and an assembly of a pair of moving grippers carried in an opposed spaced apart relationship by a pair of channel members to also grip opposite edges of the stock. The opposite ends of the assembly for the moving jaws are supported by a rolamite arrangement disposed in the channel members. A motor is connected to the moving jaw assembly to reciprocatingly move the moving jaws toward and away from the holding jaws. By a proper operation of the holding and moving jaws relative to the reciprocating movements of the moving jaws, the stock will be incrementally advanced by the feed mechanism.

---

This invention relates generally to stock feed mechanisms, and more particularly to stock feed mechanisms for feeding relatively wide strips or sheets of stock in increments to a work station or another machine such as press brake or square shear.

The primary object of the present invention is to provide a novel stock feed mechanism for accurately feeding relatively wide sheets or strips of stock with substantially no skewing of the stock relative to a line perpendicular to the direction of feeding of the stock.

A feature of the invention is the provision in the mechanism of a jaw assembly including an arrangement of rolamite devices for reciprocatingly carrying the moving jaw assembly against any skewing thereof. Such rolamite devices have recently been announced and described in various publications as a development of a subsidiary of the American Telephone & Telegraph Co.

Other objects and features of the invention will be apparent upon a perusal of the following specification and drawings in which:

FIGURE 1 is a top plan view of a stock feed mechanism constructed according to the invention;

FIGURE 2 is an enlarged side elevational view of a portion of the structure shown in FIGURE 1 and taken substantially along the line 2—2 of FIGURE 1; and FIGURE 3 is an enlarged side elevational view of a portion of the structure shown in FIGURE 1 and taken substantially along the line 3—3 of FIGURE 1.

The present embodiment is the preferred embodiment, but it is to be understood that changes can be made in the present embodiment by one skilled in the art without departing from the spirit and scope of the present invention.

The present embodiment of the invention utilizes fluid operated jaws and a fluid operated motor for advancing the stock in a feeding cycle, however other motor or gripping means well known in the art may be used in substitution thereof.

A pair of opposed spaced apart holding jaws 10 and a pair of opposed spaced apart moving jaws 11 are provided for gripping the opposite longitudinal edge portions of the sheet or strip of stock to be fed. The holding jaws 10 are carried in the forward end of a channel and frame assembly. The moving jaws 11 are reciprocatingly carried in that channel and frame assembly. A fluid motor 12 is carried on the rearward end of the channel and frame assembly and connected to a beam member 13 which carries the moving jaws 11.

In FIGURE 1 the stock to be fed is shown at 14 with a large portion of the center of the stock removed to show the structure therebelow. It is intended that the stock 14 be advanced outwardly from the holding jaws 10 to some other machine such as, for example, a press brake, a square shear or a punch press for further operations or working on the stock. The holding jaws 10 are adjustably carried on a beam member 15. The upper surface of the beam member 15 is provided with a downwardly disposed T-slot 16 extending longitudinally thereof. The T-slot 16 permits the holding jaws 10 to be adjustably secured at any spaced apart position along the member 15 to thereby accommodate stock 14 of different widths. A plate 17 is secured at each end of the member 15. The plates 17 extend within the forward ends of a pair of U-shaped channel members 18 and are secured therein by fasteners 20. A support member 19 is secured between the rearward ends of the channel member 18 by fasteners 21. The beam member 13 which carries the moving jaws 11 is also provided in the upper surface thereof with a longitudinally extending downwardly disposed T-slot 22. The T-slot 22 can be seen in FIGURE 2 and as shown by the dotted lines therein a stud 23 is carried downwardly through the moving jaw 11 and into the T-slot 22. If the nut on the upper end of the stud 23 is loosened, the moving jaw 11 can be positioned at any desired location longitudinally of the member 13 and there secured by a re-tightening of the nut on the stud 23. All of the jaws 10 and 11 are substantialy identical in construction and it should be understood that the detailed description of any part of one of those jaws is also a description of the similar part of any of the other jaws. The studs 24 of the holding jaws 10 provide for the adjustable securing of the holding jaws 10 at any selected position on the member 15. In adjusting the position of the jaws 10 and 11 it is of course obvious that the holding jaw 10 and moving jaw 11 on any one side of the feed mechanism should be positioned substantially in alignment in the direction of movement of the stock so that those jaws will uniformly grip the same longitudinal edge of the stock 14.

The U-shaped channel members 18 not only provide support for the holding jaws 10 on the member 15 and support for the motor 12 on the member 19, but also importantly provide support and alignment for the parts carrying the beam member 13. On each end of the member 13 a plate 26 is secured by fasteners 27 which may be seen in FIGURE 3. A pair of rollers 30 are rotatively carried on studs 31 which in turn are secured in each plate 26. The rollers 30 extend within the channel members 18 as can be seen in FIGURE 2. A flat ribbon of flexible material 32, such as spring steel, is also provided in each channel member 18. The forward end of each ribbon 32 extends over the plate 17 and is secured between that plate and the channel member 18 by the fasteners 20. Each ribbon 32 then extends rearwardly immediately beneath the upper wall of each channel member 18 and over the upper roller 30 on each plate 26. Each upper roller 30 is disposed partially rearwardly of each lower roller 30 and each ribbon 32 is carried about the rearward portion of each top roller 30 and over the top and forward portions of each lower roller 30. From the underside of each lower roller 30 each ribbon 32 extends along the upper side of the bottom wall of each channel member 18 rearwardly to a block member 34 carried in the rearward end of each channel member 18. The rollers 30 are further of such a diameter and are so positioned on the plates 26 that each upper roller 30 through the ribbon 32 is in contact with the underside of the upper wall of the channel member 18 and further in contact through the ribbon 32 with the lower roller 30, and each lower roller 30 in addition to the contact with each upper roller is further in contact with the lower wall of each channel member 18 through the ribbon 32. From the foregoing description it may be seen that each ribbon 32 has a somewhat S-configuration in passing about the rollers 30. Each ribbon 32 is firmly tensioned at the rearward end thereof by a stud 35. The rearward end of each ribbon 32 is secured to the block 34 by a fastener 36. The stud 35 extends through a compressed coiled spring 37, through the block 34, which is spaced from the longitudinal rear frame member 19 and through the frame member 19. A nut threaded on the outwardly extending end of each of the studs 35 permits the studs 35 to be drawn toward the members 19 to provide a tensioning and holding force on the rearward end of the ribbons 32. Other types of tensioning and adjusting arrangements can be provided for the rearward ends of the ribbons 32 in substitution of the arrangement shown. In the aforedescribed arrangements of the channel members 18, the rollers 30, and the ribbons 32, the beam member 13 which is carried through the plates 26 and upon which the moving jaws 11 are adjustably carried, is supported for reciprocating movement along the channel members 18 between the forward beam member 15 and the rearward support member 19 under conditions of extremely low friction, excellent alignment, and with substantially no skewing of the member 13 relative to a line perpendicular to the direction of movement of the member 13.

The forward limit of movement of the member 13 is determined by the bumpers 40 which may be seen in FIGURE 1 as carried on the rearward side of the member 15. The rearward limit of movement of the member 13 is determined by the stroke adjustment members 41. One stroke adjustment member 41 is adjustably secured on each channel member 18 by fasteners 42. The moving jaws 11 or the member 13 will engage the stroke adjustment members 41 when the member 13 is moved rearwardly to the end of the selected and adjusted stroke. The moving jaws 11 are reciprocatingly moved between the defined forward and rearward stroke limits by the fluid motor 12. In the present embodiment, the fluid motor 12 is a reciprocating cylinder and piston fluid motor with fluid conduit 44 connected into the head end of the cylinder of the motor 12 and with fluid conduit 45 connected into the rod end of the cylinder of the fluid motor 12. The rod end of the cylinder of the fluid motor 12 is secured to the support member 19 by the fasteners 46 as can be seen in FIGURE 1. The piston rod of the motor 12 extends through the member 19 and is secured to the member 13. With fluid under pressure delivered to either the rod or head end of the cylinder of the motor 12 and with the other end being connected to exhaust, the motor 12 will be operated to cause the member 13 to be moved by the piston rod thereof. It should be understood that more than one motor can be substituted for the single motor 12 shown and that other motors different in form from the fluid motor described may also be substituted for motor 12.

Since all of the jaws 10 and 11 are of the same construction, a detailed description of the moving jaw 11 as shown in FIGURE 2 will suffice for a description of all of the jaws. The base member 50 of the moving jaw 11 is provided with a downwardly extending rib which extends into the upper opening of the T-slot 22 for alignment on the member 13. The upper surface of the base member 50 is provided with a cavity 51. A fluid conduit 52 is connected by a fluid passageway 53 through the base member 50 into the cavity 51. An elastomer diaphragm 54 having substantially the shape of the upper surface of the base member 50 is carried on top of the base member 50 over the cavity 51. The moving jaw 11 further comprises a plate 55 which is carried on top of the diaphragm 54 and secured to the base 50. The plate 55 is provided with a substantially rectangular opening therethrough over the cavity 51 and a rectangular piston 56 is carried within that opening and resting on top of the diaphragm 54. A cantilevered upper jaw member 57 is carried to extend over the piston 56. A selected plurality of shims 58 are disposed between the plate 55 and the upper jaw member 57 to properly space the underside of the upper jaw member 57 from the upper surface of the piston 56 for any selected thickness of stock 14. Fasteners 60 are carried through the upper surface of one end of the upper jaw member 57, and through the shims 58, the piston plate 55, the diaphragm 54, and into the lower base member 50 to secure the upper jaw member 57 in the desired position. The stock 14 is shown in FIGURE 2 as disposed between the upper jaw member 57 and the piston 56. It may be seen that if fluid under pressure is delivered to the conduit 52, that fluid under pressure in cavity 51 and acting through the diaphragm 54, will cause an upwardly acting fluid force to be applied on the piston 56 to clamp the stock 14 between the piston 56 and the upper jaw 57. If the fluid under pressure in the conduit 52 is relieved, the piston 56 will restore to release any gripping force on the stock 14. As previously noted, the moving jaw 11 is adjustably secured to the member 13 by means of a stud 23. The lower end of the stud 23 is slidably carried in the T-slot 22 and extends through the base member 50, the plate 55, the shims 58, and upwardly through the upper jaw member 57. A nut threaded on the upper end of the stud 23 permits the stud 23 to firmly secure the moving jaw 11 to the member 13. Although the present embodiment contemplates fluid operated jaws, it should be understood that other jaw arrangements, such as mechanical or electrically operated jaws, may be substituted for one or more of the two pairs of jaws 10 and 11.

Any well known means may be provided for operating the holding jaws 10, the moving jaws 11, and the motor 12. It is only necessary that whatever operating means be provided, the following sequence must occur. With stock 14 carried in the jaws as shown, the first operation is a clamping operation of the moving jaws 11 with the holding jaws 10 being in an off condition. The motor 12 is then operated to advance the member 13 toward the member 15. When the member 13 reaches the member 15, to end a feed-in stroke of the stock 14, the holding jaws 10 are operated to a stock gripping condition and the moving jaws 11 are released or restored. The motor 12 is then operated to move the member 13 toward the stroke adjustment members 41. When the moving jaws 11 or the member 13 engages the members 41, the holding jaws 10 are again restored to release the stock 14, and the moving jaws 11 are again operated to a stock gripping condition. The motor 12 can then be again operated to move the member 13 toward member 15 in a stock feeding operation. A fluid valve system which can be used to control the fluid operated holding jaws 10, moving jaws 11, and motor 12 of the present embodiment, is shown and described in United States Patent No. 3,125,270, issued Mar. 17, 1964, to Howard W. Ronfeldt.

Having described the invention, what is considered new and desired to be protected by Letters Patent is:

1. In a stock feed mechanism, a pair of spaced apart channel members, stock holding jaw means extending between said channel members at one end thereof, stock moving jaw means, a pair of rollers carried on each end of said moving jaw means, each pair of said rollers carried in one of said channel members intermediate the ends thereof, a pair of flexible ribbons, each of said ribbons secured in one of said channel members longitudinally thereof and looped in an S-shape about said pair of rollers carried therein, said rollers being of a size and arranged with said ribbons and said channel members in the manner of rolamite devices, and means for moving said moving jaw means toward and away from said holding jaw means.

2. In a stock feed mechanism as defined in claim 1, wherein said moving jaw means comprises a beam member having said pairs of rollers carried on each end thereof, a pair of stock clamping members, and means adjustably carrying said pair of stock clamping members in a spaced apart relationship on the upper surface of said beam member.

3. In a stock feed mechanism as defined in claim 2, and stroke adjustment means comprising a pair of stroke members adjustably secured on said channel members and positioned to engage said moving jaw means when said moving jaw means is moved away from said holding jaw means a selected stroke distance.

4. In a stock feed mechanism as defined in claim 2, wherein said means for moving said moving jaw means toward and away from said holding jaw means comprises, a support member secured between the rearward ends of said channel members, and motor means connected between said support member and said beam member for moving said beam member toward and away from said holding jaw means.

5. In a stock feed mechanism as defined in claim 4, wherein said motor means comprises a fluid operated piston and cylinder arrangement with the cylinder carried on said support member and the piston connected to said beam member.

6. In a stock feed emchanism as defined in claim 2, wherein the upper surface of said beam member is provided with a T-slot extending longitudinally thereof, said means adjustably carrying said stock clamping members comprising manually operable fastening means carried by said stock clamping members and cooperating with said T-slot to permit manual adjustment and securing of said stock clamping members in any selected spaced apart arrangement longitudinally of said beam member.

7. In a stock feed mechanism as defined in claim 2, wherein said stock clamping members comprise open sided and opposed stock grippers for simultaneously gripping and releasing the opposite edge portions of a sheet of stock positioned therein.

8. In a stock feed mechanism as defined in claim 7, wherein said stock clamping members include fluid operated means for operating said stock grippers to grip and release any stock positioned therein.

9. In a stock feed mechanism as defined in claim 8, wherein said holding jaw means comprises a beam member secured between the forward ends of said channel members, and a pair of stock clamping members, the upper surface of said beam member being provided with a T-slot extending longitudinally thereof, each of said stock clamping members including fastening means cooperating with said T-slot to permit manual adjustment and securing of said stock clamping members in any selected spaced apart arrangement longitudinally of said beam member.

10. In a stock feed mechanism as defined in claim 9, wherein stock clamping members of said holding jaw means comprises open sided and opposed fluid operated stock grippers for simultaneously gripping and releasing the opposite edge portions of a sheet of stock positioned therein.

References Cited

UNITED STATES PATENTS

| | | | |
|---|---|---|---|
| 3,123,270 | 3/1964 | Olson | 226—141 |
| 3,273,408 | 9/1966 | Nagel | 74—37 |

M. HENSON WOOD, Jr., Primary Examiner

R. A. SCHACHER, Assistant Examiner

U.S. Cl. X.R.

226—150, 162